| United States Patent [19] | [11] Patent Number: 4,604,372 |
|---|---|
| Morishita et al. | [45] Date of Patent: Aug. 5, 1986 |

[54] AGGLOMERATED ARTICLE OF MODIFIED ZEOLITE

[75] Inventors: Satoru Morishita, Kodaira; Kenzi Shindo, Toyama; Isao Tozawa, Toyama; Yukio Taga, Toyama, all of Japan

[73] Assignee: Toyo Soda Manufacturing Co., Ltd., Yamaguchi, Japan

[21] Appl. No.: 800,914

[22] Filed: Nov. 25, 1985

Related U.S. Application Data

[63] Continuation of Ser. No. 710,952, Mar. 14, 1985, abandoned, which is a continuation of Ser. No. 381,873, May 25, 1982, abandoned.

[30] Foreign Application Priority Data

May 28, 1981 [JP] Japan .................................. 56-80183

[51] Int. Cl.$^4$ .......................... B01J 20/18; B01J 29/06
[52] U.S. Cl. ........................................ 502/62; 502/64; 502/68
[58] Field of Search .............................. 502/64, 68, 62

[56] References Cited

U.S. PATENT DOCUMENTS

| 3,158,579 | 11/1964 | Pollitzer et al. | 252/455 Z |
|---|---|---|---|
| 3,219,590 | 11/1965 | Ribaud | 252/455 Z |
| 3,234,147 | 2/1966 | Drost et al. | 252/455 Z |
| 3,262,890 | 7/1966 | Mitchell et al. | 252/455 Z |
| 3,291,754 | 12/1966 | Hanisch et al. | 252/455 Z |
| 3,296,151 | 1/1967 | Heinze et al. | 252/455 Z |
| 3,313,594 | 4/1967 | Wilson, Jr. | 252/455 Z |
| 3,384,602 | 5/1968 | Robinson | 252/455 Z |

*Primary Examiner*—Carl F. Dees
*Attorney, Agent, or Firm*—Cushman, Darby and Cushman

[57] ABSTRACT

A zeolite agglomerated article is provided, which is formed from a zeolite composition having incorporated therein at least one additive selected from alkaline earth metal oxides and hydroxides, alkaline earth metal aluminates and silicates and double salts containing an alkaline earth metal chloride. The zeolite agglomerated article is stable against a hydrothermal reaction.

5 Claims, 1 Drawing Figure

AGGLOMERATED ARTICLE OF MODIFIED ZEOLITE

This is a continuation of application Ser. No. 710,952 filed Mar. 14, 1985 which was abandoned upon the filing hereof, which is a continuation of application Ser. No. 381,873 filed May 25, 1982, now abandoned.

BACKGROUND OF THE INVENTION (1) Field of the Invention

This invention relates to improved agglomerated articles of a modified zeolite which are stable against a hydrothermal reaction and do not readily become coked with the residue of hydrocarbons.

(2) Description of the Prior Art

Zeolites are widely used in the drying processes for separating water in various industries. When an ion-exchanged zeolite of the type A is used for drying a water-containing gas composed mainly of hydrocarbons, a high separability of water from hydrocarbons can be obtained because of a specific pore size thereof, and therefore, this zeolite is especially highly evaluated in this field. In the drying processes using this zeolite, usually two or three columns, the beds of which are packed with this zeolite, are used and a water-containing hydrocarbon gas is circulated through these adsorption beds alternately or in sequence, and the zeolite layer saturated with water is contacted with a drying hot gas to be thereby regenerated. In short, the drying operation is ordinarily carried out according to the adsorption-desorption cycle. Accordingly, it is always necessary in these drying processes that the adsorbing capability of the zeolite not be degraded by a strong hydrothermal reaction to which the zeolite is subjected at the desorptive regeneration step.

It has been considered that degradation of the adsorbing capability of the zeolite as a result of the hydrothermal reaction is due to destruction of the crystal structure of the zeolite (see Japanese Patent Publication No. 3,956/73). Furthermore, it has been admitted that the degradation of the adsorbing capability as a result of thermal dehydration is characterized in that in the initial stage, the adsorption rate is reduced and, finally, deterioration is caused by the clogging of pores. We often encounter these phenomena in research and actual operation.

As one cause of degradation of the properties of zeolites due to the long-term use thereof, there can be mentioned a so-called coking phenomenon in which a gas to be dried is adsorbed in an adsorbent and the components of the adsorbed gas are polymerized or reacted and passages (pores) in the adsorbent are clogged with the resulting residues, such as polymers or carbonaceous materials. The internal diffusion resistance of the adsorbent is increased by this coking phenomenon and the adsorption zone of the adsorbent at the drying step is expanded, resulting in a substantial reduction of adsorbing capability.

A zeolite agglomerated article is ordinarily prepared by adding water to a mixture of a zeolite powder and a binder such as a clay, kneading the mixture, molding the kneaded mixture into a shaped article, and then drying and heating the shaped article which is in a hydrous state. In the so-prepared molded article, an aggregate of the zeolite crystal and the decomposition product of the clay as the binder is formed at the step of heating and sintering the hydrate in the production process. The properties of the zeolite molded article are ordinarily evaluated while both the properties of the zeolite crystal and the properties of the aggregate of the zeolite crystal and the binder are taken into consideration.

SUMMARY OF THE INVENTION

It is a primary object of the present invention to provide a zeolite agglomerated article which retains an excellent separation selectivity and non-catalytic property with respect to hydrocarbons, which are inherent in conventional zeolites, and which is thermally stable. More specifically, it is intended by the present invention to provide a zeolite agglomerated article, which is stable with respect to the hydrothermal reaction in the adsorption-desorption cycle in the process for drying gases, especially water-containing hydrocarbon gases, and in which deterioration due to the hydrothermal reaction is drastically controlled and the occurrence of coking with the residue of hydrocarbons is substantially prevented.

In accordance with the present invention, there is provided a zeolite agglomerated article formed from a zeolite composition having incorporated therein at least one additive selected from the group consisting of alkaline earth metal oxides and hydroxides, alkaline earth metal aluminates and silicates and double salts containing an alkaline earth metal chloride.

DESCRIPTION OF THE PREFERRED EMBODIMENTS

Figure 1:
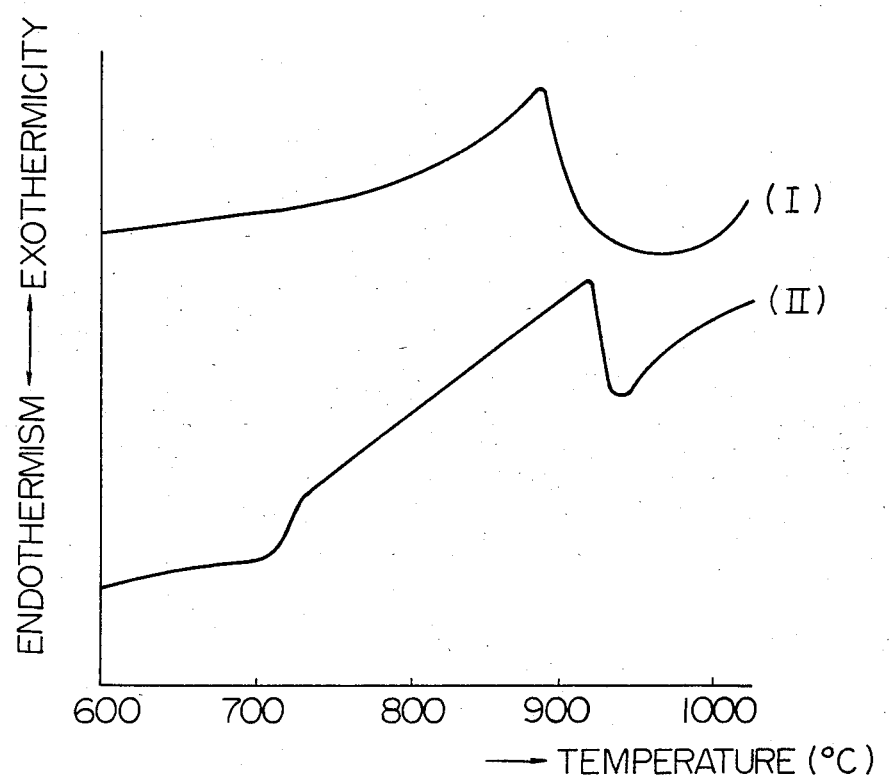
FIG. 1 shows differential thermal analysis curves of zeolite pellets wherein curves I and II correspond to a conventional zeolite pellet and the pellet of the present invention, respectively.

Either a synthetic zeolite or a natural zeolite can be used in the present invention. As the synthetic zeolite, there can be mentioned zeolites A, X and Y, mordenite, zeolite L and other zeolites. These synthetic zeolites may be prepared by effecting crystallization of alumina and silica sources under hydrothermal conditions according to customary procedures. As the natural zeolite, there can be mentioned mordenite, clinoptilolite, erionite and chabazite.

It has been confirmed that the present invention is effective for the modification of a zeolite of the type A, especially, a zeolite of the type K-A having a poor resistance to the hydrothermal reaction, such as that which has been obtained by ion-exchanging a part of sodium present in a zeolite of the type Na-A with a potassium ion. As the additive component that is used for obtaining the zeolite agglomerated article of the present invention, there can be mentioned oxides and hydroxides of alkaline earth metals such as Ca, Mg, Zn and Ba, aluminates and silicates of these alkaline earth metals and double salts containing an alkaline earth metal chloride. These additives may be used either alone or in combination. Of these additives, alkaline earth metal hydroxides and double salts containing an alkaline earth metal chloride are preferable. Preferable additives are, for example, $Ca(OH)_2$, $Mg(OH)_2$, $CaO$, $MgO$ and $3CaO.Al_2O_3.CaCl_2.nH_2O$.

The zeolite composition contains a binder. As the binder that is used for the agglomerating, there can be mentioned customary binders such as sodium silicate, clays, e.g., kaolin, montmorillonite and dickite, organic binders and chelate compounds.

The composition of the zeolite agglomerated article of the present invention is as follows. That is, the ratio by weight of binder/zeolite is preferably in the range of from 0.05 to 0.5, more preferably from 0.15 to 0.35 and the ratio by weight of additive/binder is preferably in the range of from 0.02 to 1.0, more preferably from 0.06 to 1.0. The method for preparing the agglomerated article is not particularly critical, but zeolite-forming conditions customarily adopted can be adopted in the present invention without any change.

The zeolite agglomerated article of the present invention may be of any shape such as, for example, bead, pellet, crushed article or sprayed article.

The process for preparing the zeolite agglomerated article of the present invention is not particularly limited. For example, the agglomerated article of a pellet form can be prepared by a process wherein a zeolite and a binder are mixed and kneaded together by using a stirring or sigma mixer; the mixture is extruded by an extruder into a continuous rod; the rod is dried and then cut into pellets; and the pellets are dressed and then heated at a temperature of from 400° to 700° C. The agglomerated article of a bead form can be prepared by a process wherein pellets, prepared by the above-mentioned process, are made into beads by using a rotary-disc granulator or a rotary-drum granulator, or a process wherein a mixture of a zeolite powder, a binder and water are directly made into beads by using a rotary-disc or rotary-drum granulator.

In general, conventional zeolites are used in such a form that the ion-exchangeable metal contained therein has been exchanged with an another metal such as calcium. It is to be noted, however, that the zeolite article of the present invention formed from a zeolite composition having incorporated therein an additive such as, for example, calcium oxide or hydroxide is clearly distinct from the calcium-containing conventional zeolites. That is, the calcium-containing zeolite article of the present invention can be clearly distinguished from the calcium-containing conventional zeolites by the solubility of calcium or the differential thermal analysis, as substantiated in Example 13, below.

The zeolite agglomerated article of the present invention has a surprisingly high resistance to the hydrothermal reaction. For example, an agglomerated article obtained by the incorporation of $Ca(OH)_2$ has a deterioration resistance several times to scores of times as high as the deterioration resistance of an agglomerated article obtained without the incorporation of $Ca(OH)_2$.

The present invention will now be described with reference to the following Examples, in which percents are by weight unless otherwise specified.

EXAMPLE 1

In 437 g of distilled water was dissolved 223 g of sodium hydroxide, and 248 g of aluminum hydroxide was added to the solution and completely dissolved therein by heating and stirring to form a solution of sodium aluminate containing 19.0% of $Na_2O$ and 17.8% of $Al_2O_3$. In 379 g of distilled water was dissolved 80 g of sodium hydroxide, and 191 g of finely divided silicic anhydride was added to the solution and dissolved therein by heating under agitation to obtain a solution of sodium silicate containing 0.95% of $Ns_2O$ and 29.4% of $SiO_2$.

Then, 708 g of distilled water was added to each of the above solution of sodium aluminate and the solution of sodium silicate, independently, and both the liquids were mixed by dropping to effect gelation. The composition of the obtained mixed gel, expressed by the molar ratios, was as follows:

$SiO_2/Al_2O_3 = 2.01$ $Na_2O/SiO_2 = 1.19$ $H_2O/Na_2O = 35$

The mixed slurry was heated at 85° C. for 12 hours and then cooled, and the resulting reaction product slurry was recovered by filtration, washed with water and dried at 150° C. From the results of the X-ray diffractometry, it was found that the dry product was composed of pure crystals of a zeolite of the type Na-A. From the results of the chemical analysis, it was confirmed that the product had a composition of $0.97Na_2O.Al_2O_3.2.0SiO_2. 3.5H_2O$. The amount recovered of the product in the anhydrous state was 451 g.

EXAMPLE 2

In 1,600 g of distilled water was dissolved 159 g of potassium chloride, and 347 g of the zeolite hydrate of the type Na-A prepared in Example 1 was dispersed in the solution and the dispersion was stirred at normal temperature for 30 minutes. The reaction product was recovered by filtration, washed with water and dried at 150° C. The dry product had a composition of $0.49K_2O.0.51Na_2O.Al_2O_3.2.0SiO_2. 3.1H_2O$.

EXAMPLE 3

100 g of the type K-A zeolite obtained in Example 2 was mixed with 30 g (each weight being based on the dehydrated product) of a kaolin clay by using a stirring mixer for 30 minutes, and then, the mixture was kneaded with a lignosulfonic acid salt and water by using a sigma mixer for 30 minutes. The kneaded mixture was molded into a cylinder having a diameter of 3 mm. The molded cylinder was dried at 150° C. for 1 hour, cut into a length of 5 to 8 mm and heated at 620° C. for 3 hours to obtain a zeolite molded article (pellet A).

EXAMPLE 4

A mixture of 100 g of the zeolite of the type $K_2O$-A obtained in Example 2, 2.5 g of a kaolin clay and 5.1 g (based on the dehydrated product) of a product of a composition of $3CaO.Al_2O_3.CaCl_2.nH_2O$ prepared from aqueous solutions of calcium chloride and sodium aluminate was molded, dried and heated in the same manner as described in Example 3 to obtain a zeolite molded article (pellet B).

EXAMPLE 5

A zeolite molded article (pellet C) was prepared by molding, drying and heating a mixture of 100 g of the type K-A zeolite, 25 g of a kaolin clay and 3.4 g of magnesium aluminate in the same manner as described in Example 3.

EXAMPLE 6

A zeolite molded article (pellet D) was prepared by molding, drying and heating a mixture of 100 g of the type K-A zeolite, 25 g of a kaolin clay and 3.4 g of calcium hydroxide in the same manner as described in Example 3.

EXAMPLE 7

A zeolite molded article (pellet E) was prepared by molding, drying and heating a mixture of 100 g of the type K-A zeolite, 25 g of a kaolin clay and 5.1 g of calcium hydroxide in the same manner as described in Example 3.

EXAMPLE 8

A zeolite molded article (pellet F) was prepared by molding, drying and heating a mixture of 100 g of the type K-A zeolite, 25 g of a kaolin clay and 3.9 g of calcium oxide in the same manner as described in Example 3.

EXAMPLE 9

Each of the zeolite molded articles obtained in Examples 3 through 8 was hydrated at a relative humidity of 80% for 20 hours and placed in an electric furnace maintained at 450° C. for 2 hours. This cycle of the operation was repeated and a part of the molded article was sampled at an optional frequency. Each sample was hydrated at a relative humidity of 20% for 20 hours and the volume of adsorbed water was measured. The adsorption capacity degradation resistance ratio was calculated according to the following formula:

Degradation resistance ratio at the "a"-th cycle = $\frac{A}{B} \times 100$ wherein A stands for the adsorption capacity at the a-th cycle and B stands for the adsorption capacity of the as-prepared zeolite molded article.

The results obtained at the hydrothermal test conducted in the above-mentioned manner are shown in Table 1, below.

TABLE 1

| Pellet | Water Absorption Capacity of As-Prepared Molded Article after 20 Hour's Exposure to Relative Humidity of 20% | Degradation Resistance at Hydrothermal Test | | | | |
|---|---|---|---|---|---|---|
| | | 5th cycle | 10th cycle | 15th cycle | 20th cycle | 30th cycle |
| A | 19.0% | 94.0 | 90.2 | 82.0 | 70.1 | 47.5 |
| B | 19.8% | 97.3 | 92.6 | 88.8 | 84.3 | 77.8 |
| C | 20.7% | 97.9 | 97.0 | 96.8 | 96.5 | 95.5 |
| D | 19.6% | 98.5 | 98.1 | 96.5 | 96.5 | 93.5 |
| E | 19.9% | 99.0 | 98.0 | 97.5 | 97.1 | 97.1 |
| F | 19.6% | 98.5 | 97.9 | 96.5 | 96.3 | 96.4 |

From the foregoing results, it was confirmed that in each of the pellets B through F formed by incorporation of the third component, there was formed a zeolite aggregate excellent in the hydrothermal reaction resistance, which was not observed in the molded article formed in the absence of the third component.

It was found that similar results could be obtained when each of calcium silicate, magnesium silicate and barium hydroxide was added.

EXAMPLE 10

The zeolite molded articles obtained in Examples 3 through 8 were contacted with a hydrocarbon oil composed mainly of a $C_4$ fraction, which was formed by decomposition of naphtha, in an autoclave at 250° C. for 24 hours. After this contact treatment, the zeolite molded articles were taken out, adhering hydrocarbons were removed in a nitrogen current at 250° C. under atmospheric pressure, and the amounts of carbonaceous substances left in the zeolite molded articles were measured. The coking test was conducted by conducting the above procedures and examining the increase of the amount of residual carbon. The obtained results are shown in Table 2, below.

TABLE 2

| Pellet | Carbon Content in As-Prepared Molded Article | Amount (%) of Residual Carbon after Coking Test | | | |
|---|---|---|---|---|---|
| | | 1st cycle | 2nd cycle | 3rd cycle | 4th cycle |
| A | 0.01 | 0.7 | 0.6 | 1.0 | 2.4 |
| B | 0.01 | 0.4 | 0.6 | 0.6 | 1.3 |
| C | 0.02 | 0.8 | 0.8 | 1.2 | 2.4 |
| D | 0.02 | 0.7 | 0.7 | 0.8 | 1.7 |
| E | 0.01 | 0.6 | 0.7 | 0.9 | 1.8 |
| F | 0.01 | 0.7 | 0.7 | 0.9 | 1.7 |

From the above results of the coking test, it is seen that in the improved pellets B through F, the deposition of carbon was reduced to a level equal to or lower than the level of the pellet A composed of the type K-A zeolite, which is considered to hardly undergo the coking phenomenon because of its specific pore size.

EXAMPLE 11

The amounts of the adsorbed ethylene and carbon dioxide gas were measured in each of the zeolite pellets A through F obtained in Examples 3 through 8. The adsorption conditions and the obtained results are shown in Table 3, below.

TABLE 3

| Pellet | Amount (%) of $C_2H_4$ Adsorbed at 25° C. under 530 mmHg | Amount (%) of $CO_2$ Adsorbed at 25° C. under 400 mmHg |
|---|---|---|
| A | 0.1 | 0.4 |
| B | 0.1 | 0.8 |
| C | 0.2 | 0.9 |
| D | 0.2 | 0.9 |
| E | 0.1 | 0.9 |
| F | 0.2 | 0.9 |

Incidentally, the amounts of the adsorbed ethylene, carbon dioxide gas and acetylene are often adopted as the criteria for evaluating the resistance to the coking phenomenon.

From the foregoing results, it was confirmed that the improved zeolite pellet according to the present invention substantially retains the non-adsorbing property of the type K-A zeolite to the above-mentioned gases and it fully satisfies the conventional requirement of the coking resistance that the adsorption amount of carbon dioxide gas should be less than 2.5%.

EXAMPLE 12

The pellet B prepared in Example 4 was packed in a part of a naphtha decomposition gas drying column packed with the pellet A prepared in Example 3, and the drying operation was continued for one year and the amount of residual carbonaceous substances was measured according to the method described in Example 10 to obtain the following results shown in Table 4, below.

TABLE 4

| Pellet | Amount (%) of Residual Carbon |
|---|---|
| A | 1.2 |
| B | 0.6 |

From the results of the above-mentioned test conducted in the plant of a commercial scale, it was confirmed that occurrence of the coking phenomenon is reduced in the improved pellet article according to the present invention.

EXAMPLE 13

10 g of the pellet D prepared in Example 6 was immersed in 150 ml of an aqueous 1N sodium chloride solution and maintained at a temperature of 60° to 70° C. for 20 hours under agitation. This immersion cycle was repeated 20 times. During the repeated immersion cycle, the contents of CaO, $K_2O$ and $Na_2O$ in the zeolite pellet were analyzed for determining the amount of CaO dissolving away from the zeolite pellet. This analysis was carried out by washing, drying and then chemically analyzing the pellet. A similar immersion treatment was carried out wherein an aqueous 1N zinc chloride solution was used instead of the 1N sodium chloride solution. The analysis results are shown in Tables 5 and 6, below.

For comparison parposes, the above-mentioned immersion treatment was carried out by using 10 g of a conventional zeolite pellet (pellet G) instead of the pellet D. The zeolite pellet G was prepared by the same procedure as that used for the preparation of the pellet D except that no calcium hydroxide was incorporated. Prior to the use of the zeolite pellet G in the immersion treatment, the pellet was brought into contact with a $Ca^{++}$-containing solution, thereby to conduct an ion exchange with $Ca^{++}$. The ion exchanged zeolite pellet G contained 3.6% by weight of calcium expressed in terms of CaO. The results of the immersion treatment are also shown in Tables 5 and 6, below.

TABLE 5

| | Immersion treatment in 1N NaCl | | | | | |
|---|---|---|---|---|---|---|
| | Pellet G | | | Pellet D | | |
| | Before immersion | After 9th immersion cycle | After 20th immersion cycle | Before immersion | After 9th immersion cycle | After 20th immersion cycle |
| $Na_2O$ (wt. %) | 5.0 | 14.0 | 12.4 | 6.6 | 14.0 | 12.4 |
| $K_2O$ (wt. %) | 7.0 | 0.2 | 0.1 | 8.8 | 1.2 | 1.0 |
| CaO (wt. %) | 3.6 | 0.7 | 0.1 | 3.4 | 1.2 | 0.6 |

TABLE 6

| | Immersion treatment in 1N $ZnCl_2$ | | | |
|---|---|---|---|---|
| | Pellet G | | Pellet D | |
| | Before immersion | After 11th immersion cycle | Before immersion | After 11th immersion cycle |
| $Na_2O$ (wt. %) | 5.0 | 0.1 | 6.6 | 0.2 |
| $K_2O$ (wt. %) | 7.7 | 0.4 | 8.8 | 1.3 |
| CaO (wt. %) | 3.6 | 0.1 | 3.4 | 0.6 |

The zeolite pellets D and G were subjected to differential thermal analysis under the following conditions: amount of sample, 40 mg; rate of temperature elevation, 20° C./min.; DTA sensitivity, ±100 μV; and temperature full scale, 50 mV. The results are shown in FIG. 1 wherein curves I and II correspond to the pellets G and D, respectively.

We claim:
1. A zeolite agglomerated article which is formed from a zeolite composition comprising:
   (a) a K-A zeolite which has been obtained by ion-exchanging a part of the sodium present in a Na-A zeolite with a potassium ion,
   (b) at least one additive selected from the group consisting of alkaline earth metal oxides and hydroxides, and double salts containing an alkaline earth metal chloride, and
   (c) a binder selected from the group consisting of sodium silicate, clays and organic binders, the amount of said binders being such that the ratio by weight of binder/zeolite is in the range of from 0.05 to 0.5.
2. A zeolite agglomerated article according to claim 1 wherein said additive is selected from the group consisting of alkaline earth metal hydroxides and double salts containing an alkaline earth metal chloride.
3. A zeolite agglomerated article according to claim 1 wherein said zeolite composition has incorporated therein the additive in an amount such that the ratio by weight of additive/binder is in the range of from 0.02 to 1.0.
4. A zeolite agglomerated article according to claim 3 wherein the ratio by weight of additive/binder is in the range of from 0.06 to 1.0.
5. A zeolite agglomerated article according to claim 1 wherein the ratio by weight of binder/zeolite is in the range of 0.15 to 0.35.

* * * * *